United States Patent
Rupp et al.

(10) Patent No.: US 7,870,034 B2
(45) Date of Patent: Jan. 11, 2011

(54) METHOD AND APPARATUS FOR MULTIPLE VARIABLE BIDDING IN AN ONLINE AUCTION

(75) Inventors: William D. Rupp, Mt. Lebanon, PA (US); Daniel Abeshouse, Edgewood, PA (US); Robert G. Stevens, Tokyo (JP); Sam E. Kinney, Sewickley, PA (US); Vincent F. Rago, Pittsburgh, PA (US); Scott W. Atkinson, Pittsburgh, PA (US)

(73) Assignee: Ariba, Inc., Sunnyvale, CA (US)

( * ) Notice: Subject to any disclaimer, the term of this patent is extended or adjusted under 35 U.S.C. 154(b) by 474 days.

(21) Appl. No.: 11/981,832

(22) Filed: Oct. 30, 2007

(65) Prior Publication Data
US 2008/0133399 A1    Jun. 5, 2008

Related U.S. Application Data

(63) Continuation of application No. 09/753,329, filed on Dec. 29, 2000, now Pat. No. 7,383,206, which is a continuation-in-part of application No. 09/282,157, filed on Mar. 31, 1999, now Pat. No. 7,249,085, and a continuation-in-part of application No. 09/252,790, filed on Feb. 19, 1999, now Pat. No. 6,230,146.

(60) Provisional application No. 60/101,141, filed on Sep. 18, 1998, provisional application No. 60/110,846, filed on Dec. 4, 1998.

(51) Int. Cl.
*G06Q 40/00* (2006.01)
(52) U.S. Cl. ........................................................ 705/26
(58) Field of Classification Search .................... 705/26
See application file for complete search history.

(56) References Cited

U.S. PATENT DOCUMENTS

| | | | |
|---|---|---|---|
| 3,581,072 A | 5/1971 | Nymeyer | |
| 3,637,464 A | 1/1972 | Walsh et al. | |
| 3,863,060 A | 1/1975 | Rode et al. | |
| 4,597,045 A | 6/1986 | Kiuchi | |
| 4,674,044 A | 6/1987 | Kalmus et al. | |

(Continued)

FOREIGN PATENT DOCUMENTS

EP    0399850 A    11/1990

(Continued)

OTHER PUBLICATIONS

"BroadVision Developing First Interactive Commerce Management System To Support Online Sales & Marketing Process; New Software Category Necessary to Interactive Network Architecture", Business Wire, p5150152, May 15, 1995.

(Continued)

*Primary Examiner*—Jagdish N Patel
(74) *Attorney, Agent, or Firm*—Van Pelt, Yi & James LLP

(57) ABSTRACT

A method and apparatus for automatically updating the value of a bid variable or the total bid for a multi-variable bid in an online auction is disclosed. The method includes displaying an automatically adjustable mechanism interfaced to a bidder. Thereafter, the automatic bid adjustments are calculated using the mechanism.

20 Claims, 8 Drawing Sheets

U.S. PATENT DOCUMENTS

| | | | |
|---|---|---|---|
| 4,789,928 A | 12/1988 | Fujisaki | |
| 4,799,156 A | 1/1989 | Shavit et al. | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A * | 5/1997 | Micali | 380/30 |
| 5,640,569 A | 6/1997 | Miller et al. | |
| 5,664,115 A | 9/1997 | Fraser | |
| 5,684,963 A | 11/1997 | Clement | |
| 5,689,652 A | 11/1997 | Lupien et al. | |
| 5,715,402 A | 2/1998 | Popolo | |
| 5,727,165 A | 3/1998 | Ordish et al. | |
| 5,758,327 A | 5/1998 | Gardner et al. | |
| 5,758,328 A | 5/1998 | Giovannoli | |
| 5,765,138 A | 6/1998 | Aycock et al. | |
| 5,774,873 A | 6/1998 | Berent et al. | |
| 5,794,207 A | 8/1998 | Walker et al. | |
| 5,794,219 A | 8/1998 | Brown | |
| 5,797,127 A | 8/1998 | Walker et al. | |
| 5,799,151 A | 8/1998 | Hoffer | |
| 5,799,285 A | 8/1998 | Klingman | |
| 5,802,502 A | 9/1998 | Gell et al. | |
| 5,803,500 A * | 9/1998 | Mossberg | 283/67 |
| 5,809,483 A | 9/1998 | Broka et al. | |
| 5,826,244 A * | 10/1998 | Huberman | 705/37 |
| 5,832,496 A | 11/1998 | Anand et al. | |
| 5,835,896 A * | 11/1998 | Fisher et al. | 705/37 |
| 5,862,223 A | 1/1999 | Walker et al. | |
| 5,890,138 A * | 3/1999 | Godin et al. | 705/26 |
| 5,897,621 A | 4/1999 | Boesch et al. | |
| 5,905,974 A * | 5/1999 | Fraser et al. | 705/36 R |
| 5,905,975 A | 5/1999 | Ausubel | |
| 5,915,209 A | 6/1999 | Lawrence | |
| 5,966,699 A | 10/1999 | Zandi | |
| 6,014,627 A | 1/2000 | Togher et al. | |
| 6,021,398 A * | 2/2000 | Ausubel | 705/37 |
| 6,023,685 A * | 2/2000 | Brett et al. | 705/37 |
| 6,026,383 A | 2/2000 | Ausubel | |
| 6,035,287 A | 3/2000 | Stallaert et al. | |
| 6,044,363 A | 3/2000 | Mori et al. | |
| 6,047,274 A | 4/2000 | Johnson et al. | |
| 6,052,108 A | 4/2000 | Gadd | |
| 6,055,518 A | 4/2000 | Franklin et al. | |
| 6,058,379 A | 5/2000 | Odom et al. | |
| 6,061,663 A | 5/2000 | Bloom et al. | |
| 6,078,906 A | 6/2000 | Huberman | |
| 6,119,229 A | 9/2000 | Martinez et al. | |
| 6,131,087 A | 10/2000 | Luke et al. | |
| 6,134,536 A | 10/2000 | Shepard | |
| 6,151,589 A | 11/2000 | Aggarwal et al. | |
| 6,161,099 A | 12/2000 | Harrington et al. | |
| 6,178,431 B1 | 1/2001 | Feinberg | |
| 6,199,050 B1 | 3/2001 | Alaia et al. | |
| 6,216,108 B1 | 4/2001 | LeVander | |
| 6,230,146 B1 | 5/2001 | Alaia et al. | |
| 6,236,972 B1 | 5/2001 | Shkedy | |
| 6,266,652 B1 | 7/2001 | Godin et al. | |
| 6,275,807 B1 | 8/2001 | Schirripa | |
| 6,343,277 B1 | 1/2002 | Gaus et al. | |
| 6,366,891 B1 | 4/2002 | Feinberg | |
| 6,778,968 B1 | 8/2004 | Gulati | |

| | | |
|---|---|---|
| 2002/0013631 A1 | 1/2002 | Parunak et al. |

FOREIGN PATENT DOCUMENTS

| | | |
|---|---|---|
| JP | 409101994 A | 4/1997 |
| JP | 410078992 A | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

"FairMarket Launches New Self-Serve Auctions", Business Wire, p6161495, Jun. 16, 1998.
Lee, "Do electronic marketplaces lower the price of goods?", Communications of the PCM, v41nl pp. 73-80, Jan 1998.
"Moai Technologies Introduces New categories of Business to Business Auction Software.", Business Editors and Computer writers, Mar. 16, 1998.
Kikuchi, et al., "Multi-Round Anonymous Auction Protocols", IEICE Trans. Inf. & Syst., vol. E82-D, No. 4, Apr. 1999.
"Online bidding software", Electronic Buyers' News, Issue 1 072, p86, 1/6p, Aug. 25, 1997.
Sairamesh, et al., "Economic Framework for Pricing and Charging Digital Libraries", D-Lip Magazine, Feb. 1996.
"Sold!. . . To the Lowest Bidder", Computer Finance, v6, n2, Jul. 1995.
"Venture Capitalists Fund Two Massachusetts Internet Related Companies", Boston Globe, Jan. 14, 1998.
Vigoroso, "Buyers prepare for brave new world of e-commerce", Purchasing, v126, n6, pS4(1), Apr. 22, 1999.
Von der Fehr, et al., Predatory bidding in sequential auctions, Oxford Economics Papers, v46, n3, p345(12), Jul. 1994.
Von der Fehr, et al., Predatory bidding in sequential auctions, Oxford Economics Papers, v46, n3, p345(12), Jul. 1994.
"What you need to know to bid in FCC's narrowband auction", Washington Telecom News, v2, n26, p6(2), Jun. 27, 1994.
Malone et al., "The Logic of Electronic Markets", Harvard Business Review, No. 893II, May-Jun. 1989.
Freemarkets™ Online, "Bidware Manual", Jun. 9, 1988.
Freemarkets Online™, "Online Industrial Market Making, An Overview of Purchasing Executives".
WebAuction.com, "How to Play", 1998.
Auction Sales, "Live Auctions Online", Sep. 1998.
Auction Port, "Online Auction Community—New Auctions Since 9/2/98", Jul. 1998.
OnSale, "How to Play", 1998.
u-Auction-ItTM, 1997.
Freemarkets Online™, "Homepage", 1998.
Andrews, "Auctions Catch the Interest of Hobbyists and Big Business", Aug. 24, 1998.
Associated Press, "Auction on Web is Buyer's Market", Apr. 6, 1998.
Steinert-Threlkeld, "New Watchwords: Let Sellers Beware", Jun. 1, 1998.
Woolley, "E-muscle", Mar. 9, 1998.
Associated Press, "FreeMarkets Takes Auction on Internet", Feb. 23, 1998.
Jahnke, "How Bazaar" CIO Web Business Magazine, Aug. 27, 1998.
Wilder, "What's Your Bid?—FreeMarkets' real-time online bidding technology lets clients drive down costs and improve product value", Information Week, Nov. 10, 1997.
Jean-Pierre Banatre, et al., "The Design and Building of Enchere, a Distributed Electronic Marketing System" Communications of the ACM, No. 1, Jan. 29, 1986.
Danny Cohen, "Computerized Commerce" Information Processing 89, Aug. 28-Sep. 1, 1989.
M. Reck, "Types of Electronic Auctions," Hochschule St. Gallen.
C. Wrigley, "Design Criteria for Electronic Market Servers," Electronic Markets, vol. 7, No. 4 (1997).
Wurman et al., "The Michigan Internet AuctionBot: A Configurable Auction Server for Human and Software Agents," Artificial Intelligence Laboratory, University of Michigan (1998).

PCT Notification of Transmittal of International Preliminary Examination Report for PCT Counterpart Application No. PCT/uSOO/08522 Containing International Preliminary Examination Report (Nov. 19, 2001).

"Virginia Power to Seek 1,750 MW More Through Competitive Bidding," Electric Utility Week, p. 15 (Mar. 14, 1998).

* cited by examiner

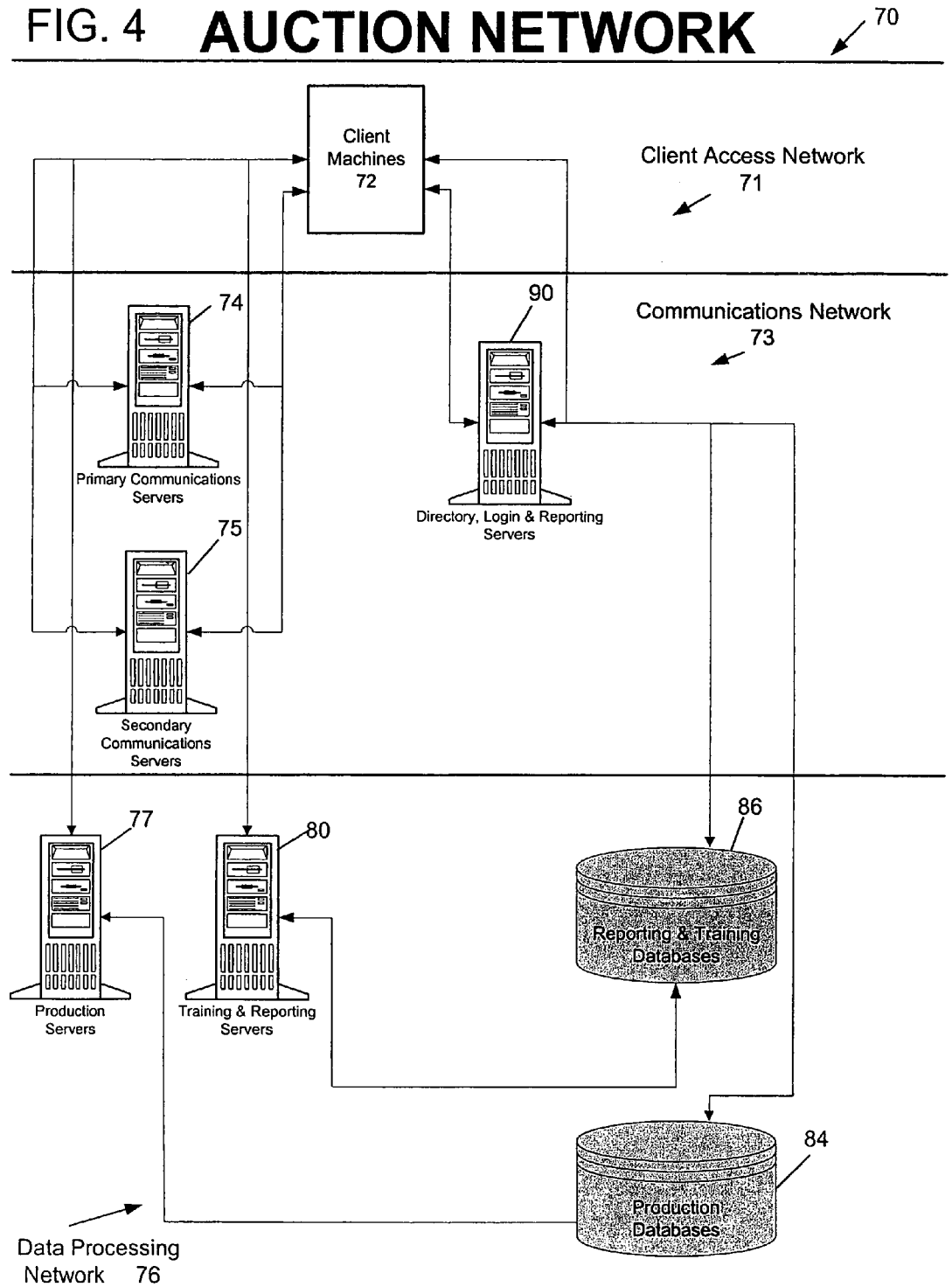
FIG. 4 AUCTION NETWORK

METHOD AND APPARATUS FOR MULTIPLE VARIABLE BIDDING IN AN ONLINE AUCTION

REFERENCE TO RELATED APPLICATIONS

This is a Continuation of application Ser. No. 09/753,329, filed Dec. 29, 2000, now U.S. Pat. No. 7,383,206 which is a CIP of U.S. application Ser. No. 09/282,157, now U.S. Pat. No. 7,249,085, filed Mar. 31, 1999 and a CIP of U.S. application Ser. No. 09/252,790, now U.S. Pat. No. 6,230,146, filed Feb. 19, 1999, which claims priority to U.S. Provisional Application No. 60/101,141, filed Sep. 18, 1998, and U.S. Provisional Application No. 60/110,846, filed Dec. 4, 1998, which are hereby incorporated by reference.

BACKGROUND OF THE INVENTION

1. Field of the Invention

The disclosed invention relates generally to conducting electronic auctions, and in particular to a method submitting multi-variable bids into an electronic auction.

2. Description of Background

Procurement of goods and services has traditionally involved high transaction costs, especially information search costs. The advent of electronic commerce has introduced new methods of procurement that lower some of the transaction costs associated with procurement. Electronic procurement, in particular business-to-business electronic commerce, matches buyers and suppliers and facilitates transactions that take place on networked processors.

Four models of online procurement have been developed: catalog, buyer-bidding auctions, seller-bidding auctions and exchange marketplaces.

The "catalog" model was an early form of online electronic procurement. Initially, electronic catalogs were developed primarily by sellers, typically suppliers, to help customers obtain information about products, and order supplies electronically. These first electronic catalogs were single-source; i.e. they only allowed customers to obtain information and products from that supplier.

Although these first electronic catalogs greatly reduced the information search costs associated with procurement, customers were disadvantageously "locked in" to one supplier at each electronic catalog. Customers were thus unable to compare a number of competing products in a single catalog. Therefore, certain suppliers with single-source catalogs began including competitors' products in their systems. The inclusion of competing products in electronic catalogs reduced procurement information search costs even further. By offering competing products, electronic catalogs became "electronic markets".

Many of these catalogs, however, are biased toward the supplier offering the electronic catalog, and it was thought that procurement costs could be lowered further through an unbiased market. Therefore, third-party "market makers" developed markets for many standard products and services, which were intended to be unbiased markets. By having a market maker develop a market for certain products by offering an unbiased electronic catalog, procurement costs are further lowered by promoting competition between suppliers as well as reducing information search costs for buyers.

Electronic commerce using the electronic catalog model typically involves one buyer and one seller at a time. When many buyers compete for the right to buy from one seller, a buyer-bidding auction model, or forward auction is created.

In a forward auction, various goods or services may be simultaneously placed for auction. As in an offline auction, bid prices start low and move upward as bidders interact to establish a closing price. Typically, the auction marketplace is one-sided, with one seller and many potential buyers, although multiple-seller auctions are possible.

Catalog and buyer-bidding auction models, however, have limitations and do not work in every situation. For example, it is difficult for a supplier to publish set prices in a catalog for custom products. Therefore, when a buyer requires a custom or hard-to-find product, pricing for that product typically will not be found in a catalog. Likewise, it is difficult to specify a custom product and identify buyers who might use that custom product for a buyer-bidding auction. Additionally, there may be only one buyer interested in a custom product, such that a buyer-bidding auction may not be applicable in all cases. Thus, there are fewer suppliers and no standard product and pricing information available for the buyer of custom industrial products.

Referring again to the cost of traditional procurement, and particularly procurement of custom products and services, when a company required a custom product, a buyer for the company would typically procure the product by searching for potential suppliers and then acquiring price quotes from the potential suppliers for the needed custom product. The search tended to be slow and random, and typically relied heavily on personal relationships. The costs associated with locating vendors, comparing prices, and negotiating a deal were therefore large. The cost of switching suppliers is also very large, such that an incumbent supplier's quoted price was most likely not the lowest price he could offer because the incumbent supplier knew the buyer would face switching costs to use another supplier. As an additional consequence, new suppliers had a difficult time entering the market.

Therefore, supplier-bidding auctions for products and services defined or specified by a buyer have been developed. The assignee of the present application has developed a system in which sellers downwardly bid against one another to achieve the lowest market price in a supplier-bidding auction.

Traditional online auctions have focused on price as the sole variable upon which the auction competition is based. In a typical business-to-business situation, however, many variables or parameters may be considered in combination with a bidder's proposed price. For example, in the negotiations for a supply contract, a buyer will compare various proposals not only on the basis of price but also on the basis on location of the supplier, contract term length, etc. In these situations, the sponsor has traditionally negotiated with each bidder independently, as the bid prices do not account for these additional variables, and therefore cannot be readily compared.

The assignee of the present invention has developed a method of transforming multi-variable bids into comparable units of measure in real-time, as disclosed in copending U.S. patent application Ser. No. 09/282,157, which has been incorporated by reference. This method of transforming multi-variable bids allows for a competitive auction of goods and services that traditionally could not take advantage of natural auction dynamics. This process performs a transformation function on all of the variables or parameters of the bid to calculate one comparative bid.

In both forward and reverse auctions, the dynamics of bidding in an auction work to the advantage of the sponsor of the auction. For example, in a forward auction, bidders may bid more than they would have paid otherwise for a product or service during the final "going, going, gone" stage of the auction because of the time pressure and excitement of the auction atmosphere, and the sponsor of the auction, in this case the seller, benefits. Likewise, in a reverse auction, bidders may bid less than they would have bid on a supply contract outside the auction, and the sponsor, this time the buyer, benefits.

To take full advantage auction bidding dynamics, an electronic auction should facilitate bid entry. If the process of submitting a bid to the electronic auction is difficult or cumbersome, the bidder may be less likely to make a bid. Additionally, in the final stages of an auction, bids are made very rapidly, and a bidder must be able to enter a competitive bid quickly and easily in order to "beat the clock".

Additionally, as discussed above, an auction may allow for multi-variable bidding. For example, in a reverse auction for custom industrial supplies, a bidder may be bidding both price and volume. Thus, it would be desirable to have a system that allowed a bidder to easily and quickly change any aspect of his bid, not just price.

Therefore, what is needed is a method of entering and adjusting bids that allows the bidder to easily set or change any aspect of the bid and submit the bid into an electronic auction.

SUMMARY OF THE INVENTION

In accordance with one form of the present invention, there is provided a method for automatically adjusting the total bid value for a multiple variable bid for an online auction, wherein said multiple bid variables are fixed, and wherein the total bid value is calculated by performing a function on the multiple bid variables. The method includes receiving initial values for each bid variable; calculating an initial total bid value by performing the function on the bid variables using the initial values; receiving an updated value for one of the bid variables; and automatically calculating an adjusted value for the total bid value by performing the function using the updated value without any additional input.

In addition, in accordance with a further aspect, a method of automatically adjusting the value of an automatically adjustable bid variable for a multiple variable bid for an online auction, wherein the total bid value for the bid is fixed, and wherein the total bid value is calculated by performing a function on the multiple bid variables is disclosed. The method comprises receiving initial values for each bid variable; calculating an initial total bid value by performing the function on the bid variables using the initial values; receiving an updated value for one of the bid variables; and automatically calculating an adjusted value for the automatically adjustable bid variable using the function and the updated value.

In addition, in accordance with a further aspect, a method of automatically adjusting the value of an automatically adjustable bid variable for a multiple variable bid for an online auction, wherein the total bid value for the bid is fixed, and wherein the total bid value is calculated by performing a function on the multiple bid variables is disclosed. The method comprises receiving initial values for each bid variable; calculating an initial total bid value by performing the function on the bid variables using the initial values; receiving an updated value for the total bid value; and automatically calculating an adjusted value for the automatically adjustable bid variable using the function and the updated total bid value such that the updated total bid value does not change.

Thus, the present invention provides a method and apparatus that beneficially encourages bidders to place bids.

BRIEF DESCRIPTION OF THE DRAWINGS

FIG. 4 is a schematic diagram of an auction network;

DETAILED DESCRIPTION

Figure 1A:
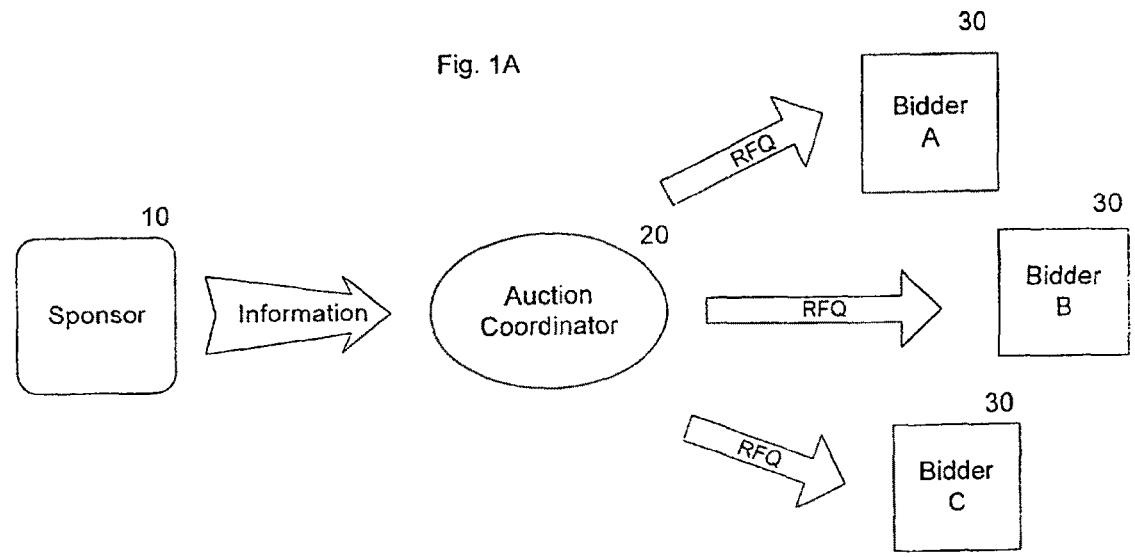
FIG. 1 is a schematic illustration of the elements and entities involved in an embodiment of an auction.

Reference will now be made in detail to the preferred embodiments of the present invention, examples of which are illustrated in the accompanying drawings. It is to be understood that the Figures and description of the present invention included herein illustrate and describe elements that are of particular relevance to the present invention, while eliminating, for purposes of clarity, other elements found in typical auction systems and computer networks. The present invention described below extends the operation of the inventive auction systems and methods described in greater detail in co-pending application Ser. No. 09/252,790, entitled "Method and System for Controlling Closing Times of Electronic Auctions Involving Multiple Lots" filed Feb. 19, 1999, the disclosure of which has been expressly incorporated in the present application.

In a reverse auction, bid prices start high and move downward as bidders interact to establish a closing price. Typically, the auction marketplace is one-sided, with one buyer and many bidders, although multiple-buyer auctions are possible. In a supplier-bidding reverse auction, bidders are potential suppliers bidding for the right to supply the buyer, or sponsor of the auction, with the products or services in the auction.

In a supplier-bidding auction for custom industrial parts, the products being purchased are components or materials. "Components" may include fabricated tangible pieces or parts that become parts of assemblies of durable products. Example components include gears, bearings, and appliance shelves. "Materials" may include bulk quantities of raw materials that are further transformed into products. Example materials include corn syrup and sheet steel. Services may also be purchased in a reverse auction.

Industrial buyers do not typically purchase one component at a time. Rather, they tend to purchase whole families of similar components. Therefore, in a typical industrial supplier-bidding auction, products are grouped together in "lots" for bidding. Each lot is composed of several "line items". In the auction, the suppliers are bidding on supplying the buyer with everything within a lot. By lotting products, potential suppliers can bid on only that portion of the business for which they are best suited, and are not required to bid on every lot. This reduces some of the barriers to entry for new potential suppliers that may only have capability to supply some of the needed products in the auction. Reducing the barriers to entry also benefits the buyer as additional bidders increase competition, and result in better bidding dynamics.

Typically, components in the auction are strongly related to one another. As an example, a buyer might purchase a given plastic knob in two different colors, or might purchase a nameplate in four different languages. These parts are so similar that by definition they must be purchased from the same supplier—all of the knobs are made using with same mold. These items will typically be grouped in a single "lot". As is known by one skilled in the art, there are many additional methods of lotting products for an auction.

Bidding in an auction with lots may be at the lot level or at the line item level. If bidding occurs at the lot level, bidders bid a price for supplying every product or service in a lot. If bidding occurs at the line item level, bidders bid a price for each line item, and these line item bids are aggregated by the auction software into a lot-level bid. In either case, competition occurs at the lot level.

Figure 1B:
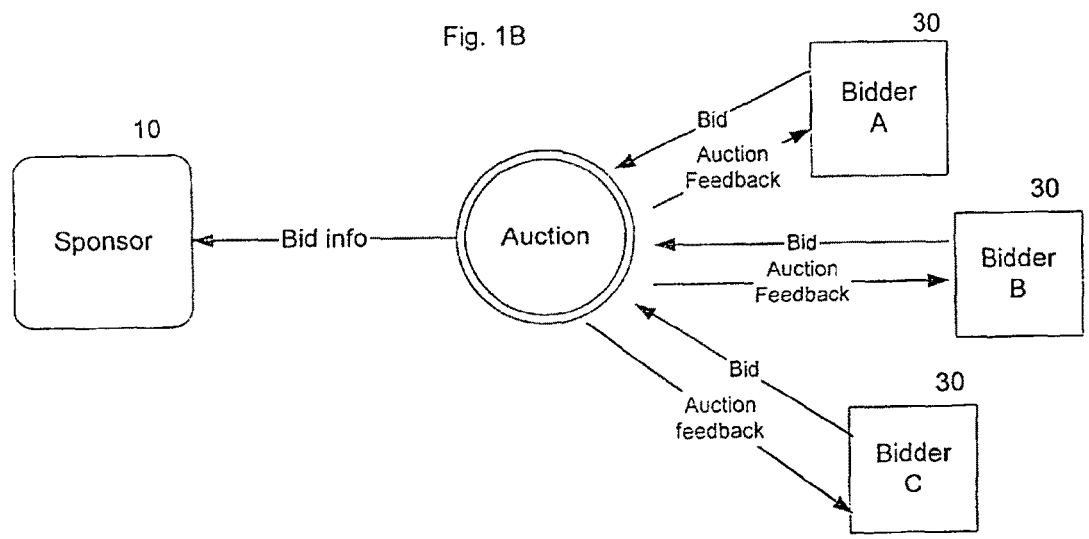
Figure 1C:
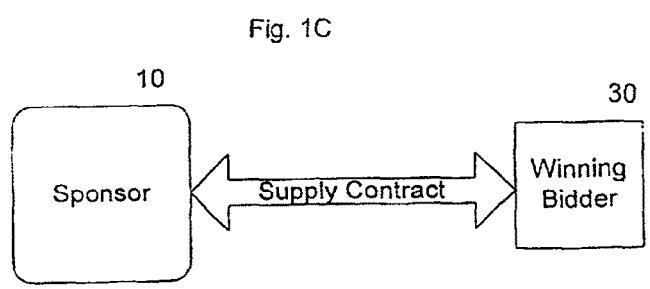

The basic process for a supplier-bidding auction as conducted by the assignee of the present invention is described below with reference to FIG. 1. FIG. 1 illustrates the functional elements and entities in setting up and conducting a typical supplier-bidding auction. FIG. 1A illustrates the creation of an auctioning event, FIG. 1B illustrates the bidding during an auction, and FIG. 1C illustrates results after completion of a successful auction.

As will be apparent to one skilled in the art, while the invention is generally described in terms of one buyer and multiple suppliers, the present invention may also be used in other types of electronic markets, such as auctions with multiple buyers and multiple sellers, forward auctions having a single seller and multiple potential buyers, or electronic exchange marketplaces.

The term "sponsor" will be utilized herein to identify the party or parties that originate the auction. In a forward auction, for example, the sponsor is typically a seller of one or more goods or services. In a forward auction, the sponsor(s) might specify a good to be sold in the auction and receive bids from parties wishing to purchase that good. Those parties wishing to purchase that good are "bidders" in a forward auction.

In a reverse auction example, the sponsor is typically a purchaser or buyer of one or more goods or services. In a reverse auction, the sponsor(s) buyer might specify a good desired for purchase through the auction and receive bids from parties wishing to supply that good. Those parties wishing to supply that good are "bidders" in a reverse auction.

In the typical supplier-bidding auction model, the bidding product or service is defined by the sponsor of the auction. As shown in FIG. 1A, when the sponsor 10 decides to use the auctioning system of the present invention to procure products or services, the sponsor 10 provides information to an auction coordinator 20. This information may include information about incumbent suppliers and historic prices paid for the bidding products or services, for example. Typically, the sponsor 10 works with the auction coordinator 20 to define the bidding products and services, and if desired, lot the products and services appropriately so that the needed products and services can be procured using optimal auction dynamics. A specification may then be prepared for each desired product or service and a Request for Quotation (RFQ) generated for the auction.

Next, the auction coordinator 20 identifies potential suppliers 30, preferably with input from the sponsor 10, and invites the potential suppliers 30 to participate in the upcoming auction. The potential suppliers are given access to the RFQ, typically through a printed published RFQ document, although the RFQ may be published on an identified Website.

As shown in FIG. 1B, during a typical auction, bids are made against lots. Generally, bidders must submit actual unit prices for all line items within a lot, however, the competition in an auction is based on the aggregate value bid for lots. The aggregate value bid for a lot depends upon the level and mix of line item bids and the quantity of goods or services that are offered for each line item. Therefore, although bidders may submit bids at the line item level, they are competing on the lot level. During the auction, the sponsor 10 can typically monitor the bidding as it occurs. Bidders 30 may also be given some feedback on the auction activity so that they may bid competitively.

Feedback about bidding activity is generally referred to as "market feedback" and may include any information or data related to the bidders 30 or their bids, interrelationships between bids, and any other bid related information or data that is received before or during the auction. Market feedback may include, for example, bids that have been placed by other bidders, the rank of a bidder's bid in relation to one or more other bidders, the identity of bidders, or any subset of that information. Market feedback may also include non-pricing information such as, for example, the quality of goods to be provided by bidders and shipping costs associated with one or more bidders. Providing such market feedback to bidders in an auction helps create real-time competitive interaction among bidders in the auction because, without feedback, bidders who are not leading in an auction might not be aware of their relative position and have less incentive to revise price quotes and place additional competitive bids.

After the auction, the auction coordinator may analyze the auction results with the sponsor. In a supplier-bidding auction, the sponsor typically conducts final qualification of the low bidding supplier(s). The sponsor may retain the right not to award business to a low bidding supplier based on final qualification or other business concerns. As shown in FIG. 1C, at least one supply contract is usually drawn up and executed based on the results of the auction.

The auction is conducted electronically between bidders 30 at their respective remote sites and the auction coordinator 20 at its site. In an alternative embodiment, instead of the auction coordinator 20 managing the auction at its site, the sponsor 10 may perform auction coordinator tasks at its site.

Figure 2:
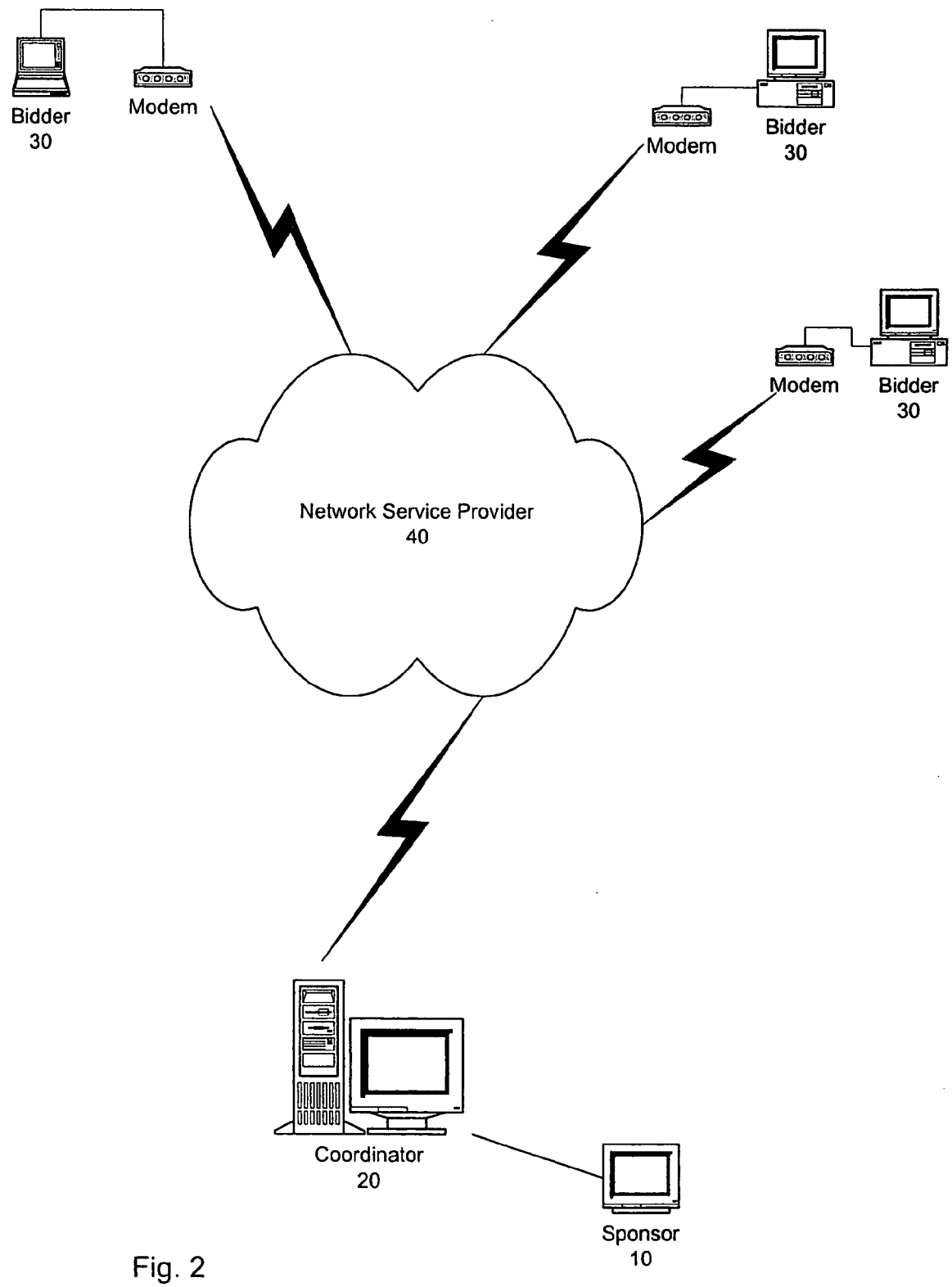
FIG. 2 is a tabular illustration of the tasks performed by the entities involved in the auction of FIG. 1.

Information is conveyed between the coordinator 20 and the bidders 30 via any known communications medium. As shown in FIG. 2, bidders 30 may be connected to the auction through the Internet via a network service provider accessed, for example, through a dial-up telephone connection. Alternatively, sponsors 10 and bidders 30 may be connected to the auction by communicating directly with the coordinator 20 through a public switched telephone network, a wireless network, or any other known connection method. Other methods of connecting sponsors and bidders and other communications mediums are known to those skilled in the art, and are intended to be included within the scope of the present invention.

Figure 3:
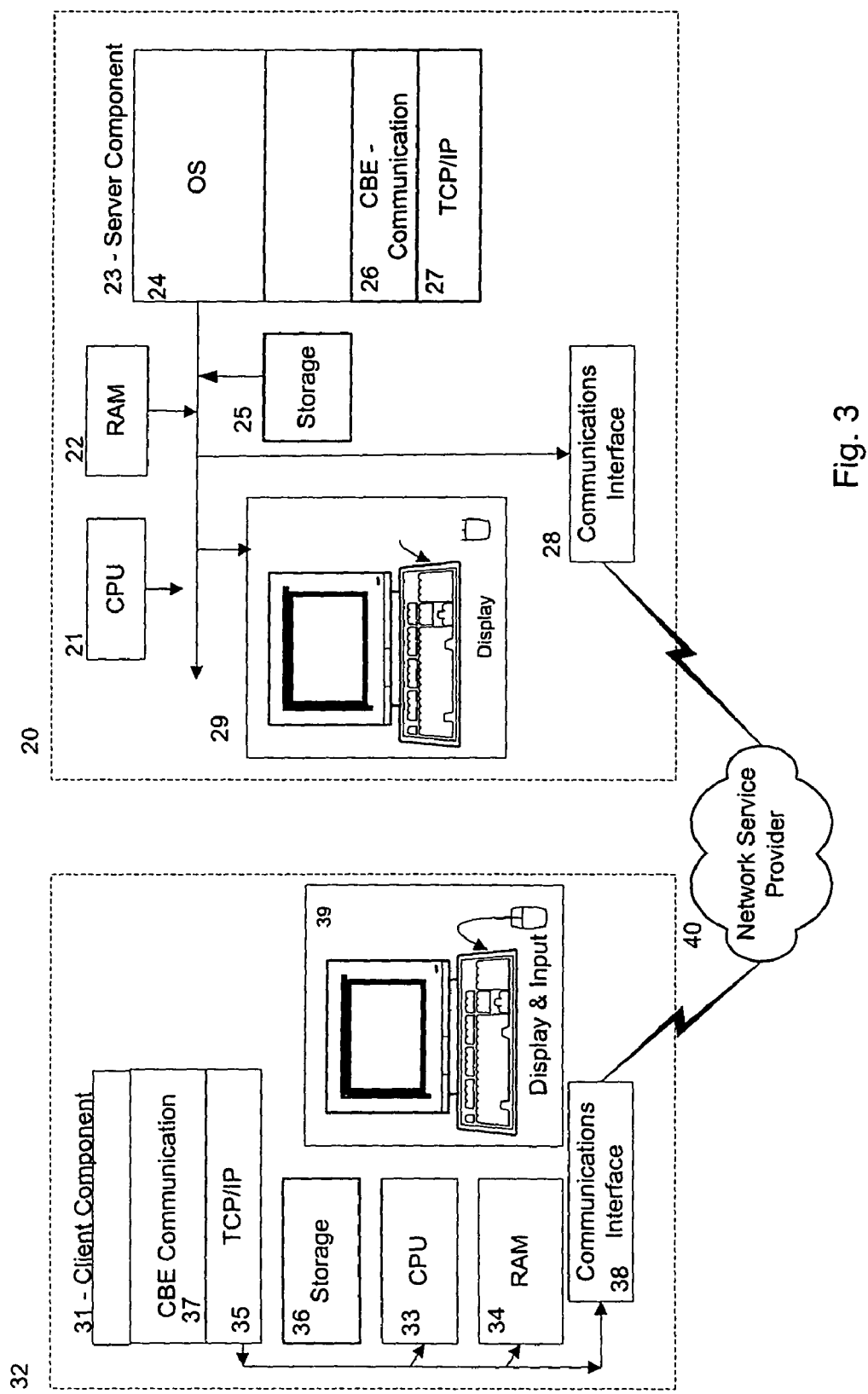
FIG. 3 is a schematic illustration of the communications links between the coordinator, the sponsor and the bidders in the auction of FIG. 1.

A computer software application is used to manage the auction. The software application preferably has two components: a client component 31 and a server component 23. FIG. 3 illustrates a server component 23 and a client component 31 resident in host computers in a first embodiment. As is shown in FIG. 3, the server component of that embodiment includes an operating system 24, competitive bidding event communications software 26, and Internet protocol software 27. The server software is hosted on a computer 20 having a processor 21, random access memory 22, and a data storage facility 23. The host computer 20 also includes input and output devices 29 such as, for example, a monitor, printer, mouse and keyboard, and a communications interface 28 for communicating with the client component 31.

The client component of the embodiment illustrated in FIG. 3 includes competitive bidding event communication software 37, and Internet protocol software 35. The client component software is hosted on a computer 32 having a processor 33, random access memory 34, and a data storage facility 36. The host computer 32 also includes input and output devices 39 such as, for example, a monitor, printer, mouse and keyboard, and a communications interface for communicating with the server component 23.

The client component 31 is used by the bidders to make bids during the auction, and to receive and display feedback from the auction. The client component may, for example, be a program that is installed on a bidder's computer, or it may be software that is accessed and run from a Website. The client component 31 preferably includes software and a graphical user interface for implementing the bid adjustment mechanisms described in connection with FIGS. 5-7 below. Bids are preferably only able to be submitted using the client component of the application, thereby ensuring that buyers cannot circumvent the bidding process, and that only invited bidders participate in the bidding. Each computer software application may be stored in a data storage device and executed by a processor such as those described in connection with FIG. 4 described hereinbelow.

Bids are sent over the communications medium to, for example, the auction coordinator, or where the sponsor is performing auction coordinator tasks, directly to the sponsor. Bids are received by the server component 23. The client component includes software functions for making a connection over the Internet, or other medium, to the server component. Bids are submitted over this connection and feedback is sent to connected bidders.

Although the present invention is described in terms of a server component and a client component, one skilled in the art will understand that the present invention is not limited to a client/server program relationship model, and may be implemented in a peer-to-peer communications model, or any other model known to those skilled in the art.

When a bidder submits a bid, that bid is sent to the server component and evaluated to determine whether it is a valid or acceptable bid. Market feedback about received bids is sent to connected bidders enabling bidders to see changes in market conditions and plan competitive responses.

The embodiments described herein utilize an online reverse auction, wherein the present invention is performed by a computer processor, as an example in which the present invention may be utilized. In these examples, suppliers bid to supply goods or services to a buyer and the buyer typically purchases the goods or services from the lowest priced qualified bidder. It is to be understood, however, that the present invention may be used in other applications. The auction does not necessarily have to occur online, and the present invention may be performed by other than a computer processor. The present invention may also be utilized in connection with auctions other than reverse auctions. For example, the present invention may be advantageously utilized with forward auctions, wherein the bidder offering the highest qualified bid, rather than the lowest qualified bid, is awarded the goods or services being sold. In the case of a forward auction, the "leading bid" is the highest bid and the leading bidder is the bidder making that highest offer, while in a reverse auction, the "leading" bid is the lowest bid and the leading bidders is the bidders making the lowest bid. Similarly, placing a "better bid" in a reverse auction indicates placing a lower bid, while placing a "better bid" in a forward auction indicates placing a higher bid.

FIG. 4 is a diagram illustrating an auction network 70 of the present invention for operating an auction, and into which the server component 23 and client component 31 may be incorporated. The auction network 70 may be divided into three functional sections: a client access network 71, a communications network 73, and a data processing network 76. The client access network 71 may, for example, include one or more client machines 72 for accessing and communicating with the communications network 73. The communications network 73 may include one or more primary communications servers 74, secondary communications servers 75, and directory, login and reporting servers 90. The data processing network 76 may include production servers 77, training and reporting servers 80, reporting and training databases 86, and production databases 84. The production servers 77 and training and reporting servers 80 are referred to collectively herein as bid servers 77 and 80.

The client machines 72 may be, for example, personal computers and may be located at each bidder 30 and sponsor site 10 for accessing the auction. The client machines 72 may access the auction by, for example, connecting to a web site operated by the party hosting the auction. The client machines 72 may also receive software from the communications network 73 that facilitates communications with the communications network 73. Each client machine 72 may have a processor that executes applicable software, and a data storage device that stores applicable software and other auction data.

The primary communications servers 74 are utilized to provide information to bids 58 received from the client machines 72 to the bid servers 77 and 80, and to provide that bid information from the bid servers 77 and 80 to the client machines 72. The primary communications servers 74 may furthermore act as a firewall to prevent direct access to the bid servers 77 and 80 by the client machines. The secondary communications servers 75 act as backups to the primary communications servers 74. The secondary communications servers 75 will perform the communication functions normally performed by the primary communications servers 74 if a failure occurs in the primary communications servers 74, thereby providing redundancy to the auction network 70.

The directory, login, and reporting servers 90 may perform a variety of functions that may be performed by a single server or include separate servers for the various functions. The directory, login, and reporting servers 90 may include a web server that acts as a portal for access to the auction network 70. As such, the directory, login, and reporting servers 90 will receive login requests for access to the auction network 70 via, for example, the Internet. The directory, login, and reporting servers 90 may make access decisions as to whether a client machine 72 is permitted to access the communications network 73. If access is permitted, the directory, login, and reporting servers 90 will direct the client machine 72 to the appropriate portion of the auction network 70. The directory, login, and reporting servers 90, may provide reports to client machines 72. For example, information from prior auctions which may be utilized by sponsors 10 to make a decision as to which bidder 30 will be awarded the sale and to permit the sponsor 10 to consider the way in which the auction proceeded so that future auctions may be refined.

The production servers 77 run the bidding software that facilitates the auction process. The production servers 77 may communicate with client machines 72 through primary and secondary communications servers 74 and 75. The production servers 77 may also be redundant so that if a failure occurs in the production server 77 that is being utilized in an auction event, the redundant backup production server 77 may perform the functions of the failed production server 77 and, thus, prevent failure of the auction.

The training and reporting servers 80 operate in a manner similar to the production servers 77 and provide reports for auctions. It is useful to operate test auctions to test the operating systems and to train personnel and clients. Such testing may be performed on the production servers 77 or, to prevent any degradation of system operation in actual auctions, one or more separate training servers may be utilized for testing and training. Reporting may also be accomplished on the production servers 77 or the report creation functions may be off-loaded to one or more reporting servers 80. The reporting servers 80 may furthermore be combined with the training servers 80.

Each server 74, 75, 77, 80, and 90 may have a processor that executes applicable software, and a data storage device that stores applicable software and data.

Data related to auctions may furthermore be held in one or more storage devices. The data storage devices may, for example, be a magnetic storage device, a random access memory device (RAM), or a read only memory device (ROM). The data may include pre-auction data, post auction data, and data that is related to active auctions. Pre-auction data may include, for example, bidders 30 that are permitted to bid on a particular auction and the scheduled auction starting and ending times. Post auction data may include the bids and bid times received in a particular auction and reports displaying that data in user friendly formats. Active auction data may include data received from the bidders 30 as the auction is taking place and related data such as the rank of each bidder 30.

The "rank" of the bidders 30 is generally determined by comparing the lowest bid by each bidder 30 and ordering the bidders 30 according to those lowest bids. The bidder 30 ranked first is the bidder 30 that has bid lower than any other bidder 30 in a reverse auction. The last rank may be a rank equal to the number of bidders 30 who have submitted bids in the auction. In the case of tie bids between bidders, the last rank may be a rank equal to the number of unique bids by each bidder. In a reverse auction based on price only, the bidder 30 having that last rank is the bidder 30 that has submitted the highest amount.

Of course, there are many known ways to calculate rank, and any of those may be used in connection with the subject invention, and are intended to be within the scope of the present invention. The bidders 30 are generally ranked between first and last according to their lowest submitted bids in a reverse auction. Thus, a higher, or better ranked bidder 30 in a reverse auction is a bidder 30 who has placed a comparatively lower bid, while a higher, or better ranked bidder 30 in a forward auction is a bidder 30 who has placed a comparatively higher bid.

The bid rank may also be based on factors other than price, including total value and any other factor that is useful in an auction setting. Bids may also be placed in a number of ways including, for example, absolute total value, or comparative value such as bidding in relation to an index price.

Three databases, or groupings of databases, are incorporated into the auction network illustrated in FIG. 4. The production databases 84 hold data that will be used by or is received from the production servers 77, while the reporting and training databases 86 hold data that will be used by or is received from the training and reporting servers 80.

The directory, login, and reporting servers 90 illustrated provide a web portal for the client machines 72. The directory, login, and reporting servers 90 provide an initial contact point for the client machines 72, access to auctions in which the client machine 72 is permitted to participate, and reports relating to active and closed auctions.

One skilled in the art will recognize that certain components of the network described herein, while beneficial to an auction network, are not necessary components in an operational auction network. For example, the secondary communications servers 75 could be removed where the benefit of redundancy is not desired, and the primary communications servers 74 could be removed and the client machines 72 could communicate directly with the bid servers 77 and 80.

As discussed above in relation to transformation bidding, traditional online auctions have focused on price as the sole variable upon which the auction competition is based. In a typical business-to-business situation, however, many variables or parameters may be considered in combination with a bidder's proposed price. This is especially true in auctions for custom goods and services. For example, in the negotiations for a supply contract, a buyer will compare various proposals not only on the basis of price but also on the basis on location of the supplier, reputation of the supplier, contract term length, etc. In these situations, the buyer or sponsor has traditionally negotiated with each bidder independently, as the bid prices alone do not account for these additional variables, and therefore cannot be readily compared.

Bids in the present auctioning system, however, may take into account one or more factors other than price, such as quality, transportation and contract term length. These bid variables are transformed into a summarized bid when they are submitted into the auction. The summarized bid is used as a comparative bid by the sponsor of the auction to evaluate bids. This transformation evens the playing field between all bidders bidding in a particular auction, because it takes into account the different cost factors. In one embodiment of the present invention, a bidder may see other bidders' summarized, comparative bids as market feedback.

In one embodiment of the present invention, non-price bid variables may be broken into ranges that are scored. For example, one of the variables in a bid may be the location of the bidder. This variable may be scored by calculating the distance of the bidder from the sponsor of the auction. Bidders that are within a 50-mile radius of the sponsor may get a score of 10, while bidders that are within a 51-100 radius of the sponsor get a score of 9, and so forth. These scores are used by the transformation process in calculating the comparative bid.

Each bid variable that is used in calculating the comparative bid is given a weight. The sponsor of the auction typically determines how much each variable should be considered in the comparative bid. For example, for a particular lot, the reputation of the supplier may be very important to the sponsor of the auction, and be given a weight of 20%, while the actual bid price is given a weight of 80%. In this case, the reputation factor is quantified as a score. The weight of each variable may or may not be communicated to the bidders. In addition, the weight of each bid variable may be different for different lots within an auction, or different lots within an auction may use different bid variables.

Some of the variables that are used in the transformation process may be based on inherent characteristics of the bidder. For example, the sponsor of the auction may want to consider the reputation of a supplier when comparing bids in a supplier-bidding auction. This is not a variable that can be entered by the bidder, as each bidder will likely give itself a high rating. For these types of bid variables, the sponsor of the auction, or the auction coordinator, will typically assign values to the bidders before the auction to be used by the transformation process. These values, and the weight of these variables, may or may not be communicated to the bidders. In addition, the sponsor or auction coordinator may or may not communicate to the bidder that these types of bid variables are being used in calculating a comparative bid.

Values for other bid variables are set or entered by the bidder. Some variables may have unchanging values, and may be set by the bidder before the auction or in a first bid submitted into the auction. An example of this type of bid variable may include the location of the bidder. For this type of bid variable, there is no need for a user interface that allows the bidder to change the value of the variable during the course of an auction.

However, other bid variables require a user interface that allows the bidder to adjust the value of the variable during the auction. These types of bid variables may include quantity or a characteristic of the auction products. For example, in the coal market, the characteristics of the supplier's coal may be important to the buyer. In a supplier-bidding auction for coal, the bidder may have to input the percentage sulfur, percentage ash and percentage water, as well as other characteristics, in the bid.

During the course of an auction, the bidder may want to adjust his values for these bid variables, therefore, the present invention provides for a user interface for the bidder to input and adjust values for these variables. The present invention allows for multiple variables of a bid to be set individually. Preferably, a bidder may set different values for the bid variables in each lot in an auction.

The benefit of auctions comes from the competition between bidders. Therefore, it is important that the interface the bidders use be as simple and easy-to-use as possible so bidders have no disincentives to stay competitive. In addition, bidders should have the ability to quickly change a bid in order to promote competition in the auction. If a bidder has to set a value for every bid variable each time he submits a bid, he may not be able to enter bids quickly enough.

For these reasons, the present invention provides for a flexible automatic bid variable adjustment mechanism that allows the bidder to decide which variable(s) the software should automatically adjust when another variable(s) is manually adjusted. More specifically, the inventive system automatically adjusts the values of one or more bid variables and/or the lot bid price when another bid variable and/or the lot price is adjusted, such that fixed variables do not change value. The inventive system allows the user to determine whether a variable is fixed or automatically adjustable.

As discussed in copending U.S. patent application Ser. No. 09/282,157, entitled "Method and System for Conducting Electronic Auctions with Multi-Parameter Price Equalization Bidding," filed on Mar. 31, 1999, which has been incorporated by reference, a comparative, total bid value can be determined by the general formula:

$$\text{total bid} = F(\text{variable 1, variable 2, ... variable n}),$$

where F is a transformation function that operates on the n variables to yield a summarized, comparative bid value, herein called the "total bid".

For example, consider an auction where the bidders enter both a bid price and a bid quantity as part of the bid. In this case, the total bid price function may be expressed as:

$$\text{total bid} = F(\text{bid price, bid quantity}).$$

One example of such a formula is simply:

$$\text{total bid} = (\text{bid price} \times \text{bid quantity})$$

Using this example, in one particular bid, a bidder may have the price set to $1000 and the quantity set to 100. In this case, the total bid value would be ($1000×100), or $100,000. In this example, United States dollars are used for the currency, however any units of currency may be used. Alternatively, the price may be set in dollars per unit of measurement. For example, the price may represent dollars per barrel of oil, and where quantity is measured in barrels of oil.

From the above total bid price function, the equation for calculating one of the bid variables from the total bid and the other bid variables can be calculated. Using the general formula given above, the value of bid variable 1 can be expressed as:

$$\text{variable 1} = F2(\text{total bid, variable 2, variable 3 ... variable n})$$

Using the example above where bidders enter both a bid price and a bid quantity, the quantity variable of a bid can be determined from the total bid value and bid price are, as shown:

$$\text{bid quantity} = F2(\text{total bid, bid price})$$

Using the specific example given above where total bid=(bid price×bid quantity), the formula for calculating the bid quantity may be expressed as:

$$\text{bid quantity} = (\text{total bid/bid price})$$

The system of the present invention uses these functions to enable the bidder to set the automatic adjustment value for some variables to be either "fixed" or "adjustable", manually adjust another variable and have the system automatically adjust the variables for which the automatic adjustment value is "adjustable". This feature chooses the appropriate function (F, F2, etc.) to calculate the value of the bid variables that are automatically adjusted by the system.

Using the example above wherein the bid has bid quantity and bid price variables, a bidder may set the automatic adjustment value for the total bid for a lot to "fixed", and the automatic adjustment value for the bid quantity to be "adjustable". When the bidder adjusts the bid price, the bid quantity is automatically adjusted. The system uses F2 from the equations above to calculate the new value for the bid quantity. Using the specific example above, bid quantity is calculated by the formula:

$$\text{bid quantity} = (\text{total bid/bid price})$$

If the bidder has the total bid for a lot set at 100,000 and adjusts the bid price to $500, a new value for bid quantity is calculated by:

$$\text{bid quantity} = (100,000/500) = 200$$

By automatically adjusting the bid quantity, the total bid for a lot is maintained. This may be important for a bidder who wants to maintain better control of internal needs like capacity and delivery strategy.

Alternatively, the bidder may "fix" the value of the bid quantity variable, and allow the total bid to be automatically adjustable. When the bidder adjusts the bid price in this case, the bid quantity remains the same, but the total bid value for the lot is automatically adjusted. The system uses F from the equations above to calculate the new value for the total bid. Using the specific example above, the value of the total bid is calculated by the formula:

total bid=(bid price×bid quantity)

If the bidder has the bid quantity set at 200 and adjusts the bid price to $400, a new value for the total bid is calculated by:

total bid=($400×200)=$80,000

By automatically adjusting the total bid, the bid quantity for a lot is maintained. This allows a bidder to be more aggressive in the market by easily and quickly changing his total bid value by only adjusting the bid price.

In one embodiment, the sponsor or the auction coordinator determines which bid variables can be automatically adjusted. In another embodiment, the automatic bid variable adjustment mechanism is implemented by giving the bidder the ability to set the automatic adjustment of the bid variables and/or the total bid price for a lot.

Bidders may be given the option of setting the automatic adjustment value for certain bid variables before the auction begins. Additionally, bidders may be provided with a user interface for changing the value of the automatic adjustment for each adjustable bid variable and the total bid price. During the auction, the bidder can re-evaluate the automatic adjustment of the bid variables and change if necessary in response to movement in the market, or for other reasons.

In this manner, the automatic bid variable adjustment mechanism of the present invention allows bidders to rapidly adjust bids in response to market activity.

An example of a user interface that may be used to set the automatic adjustment value for the bid variables is shown in FIGS. 5A-5F. As shown in this example, each bid variable and the total bid are given radio boxes 511, 512, 515, 516, 521 and 522 for the user to set this value. As will be obvious to those skilled in the art, other interfaces may be used, such as pull-downs, menu bars and the like.

Figure 5A:
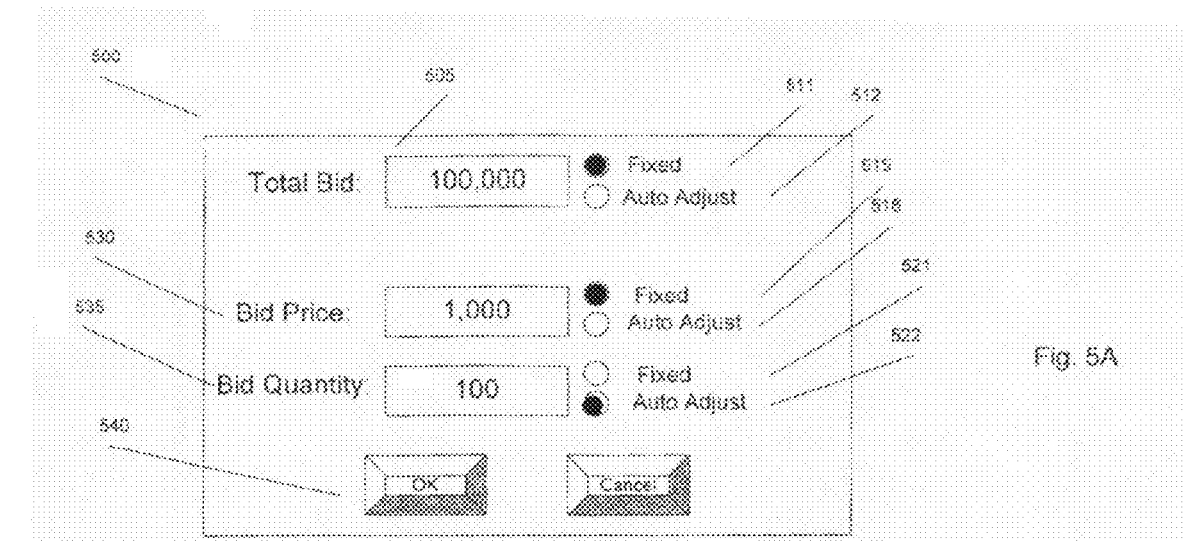
FIGS. 5A-5F illustrate several user-interfaces for setting the automatically adjustable feature for bid variables in a multiple variable bid, in accordance with various embodiments of the present invention.
Figure 5B:
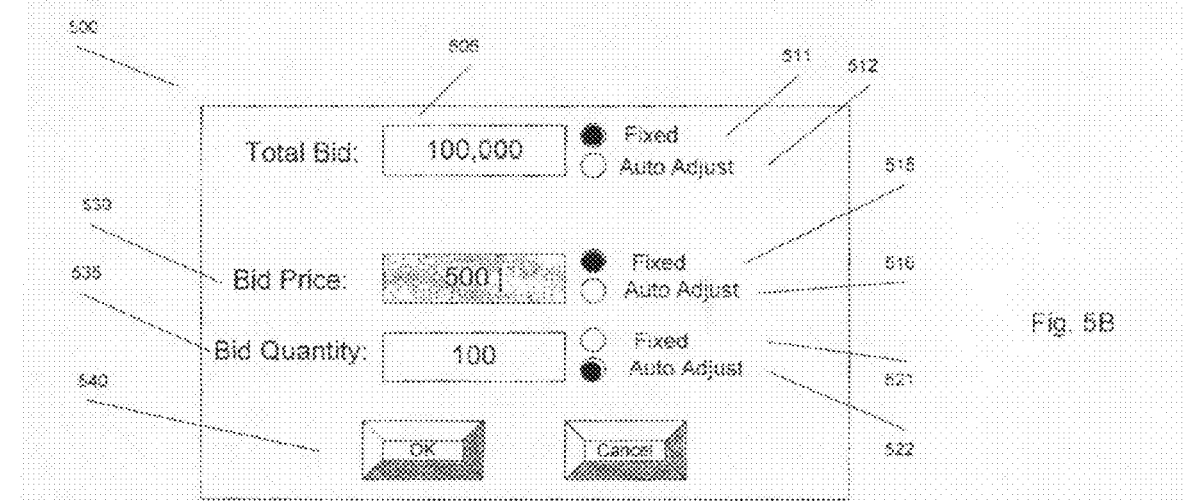
Figure 5C:
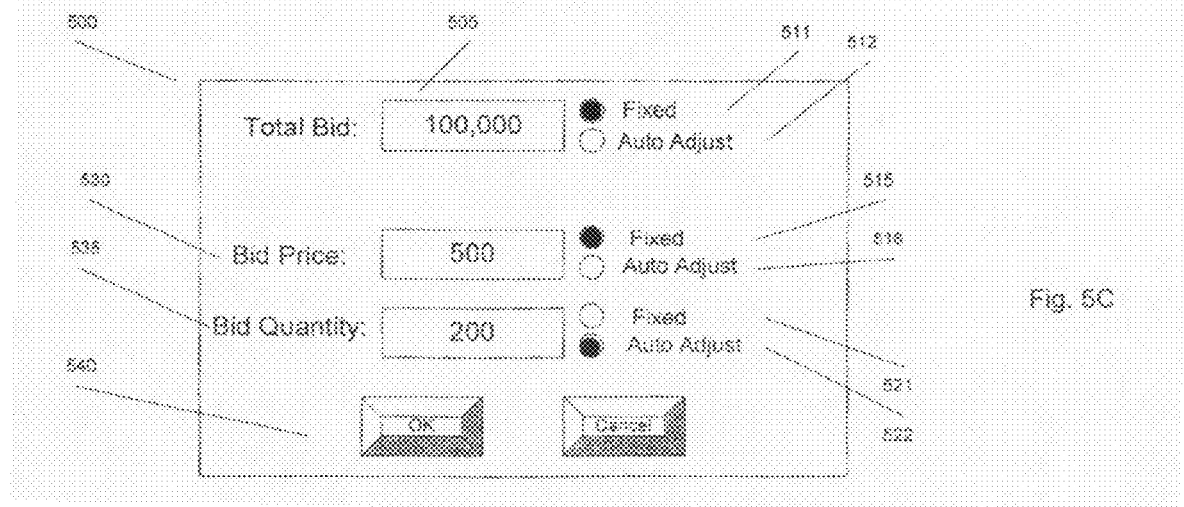

In the embodiment of the present invention shown in FIGS. 5A-5F, the user may set only one variable or the total bid to be "adjustable". As shown in FIGS. 5A-5F, the bidder may use automatic bid adjustment radio buttons 512, 516 and 522 to set one of the bid variables or the total bid value to be automatically adjustable. FIGS. 5A-5C illustrate the first above example, wherein the bid quantity is automatically adjustable, as shown by radio button 522. FIG. 5A shows the bid before the bidder changes the bid price to 500. FIG. 5B shows the bidder changing the bid price 530 to 500. When the bidder presses the <Enter> key after typing in the new bid price value, the bid quantity 535 is automatically adjusted to 200 so that the total bid value 505 of 100,000 is maintained, as shown in FIG. 5C. In an alternative embodiment, the automatic adjustments are not calculated until the user clicks the OK button 540.

Figure 5D:
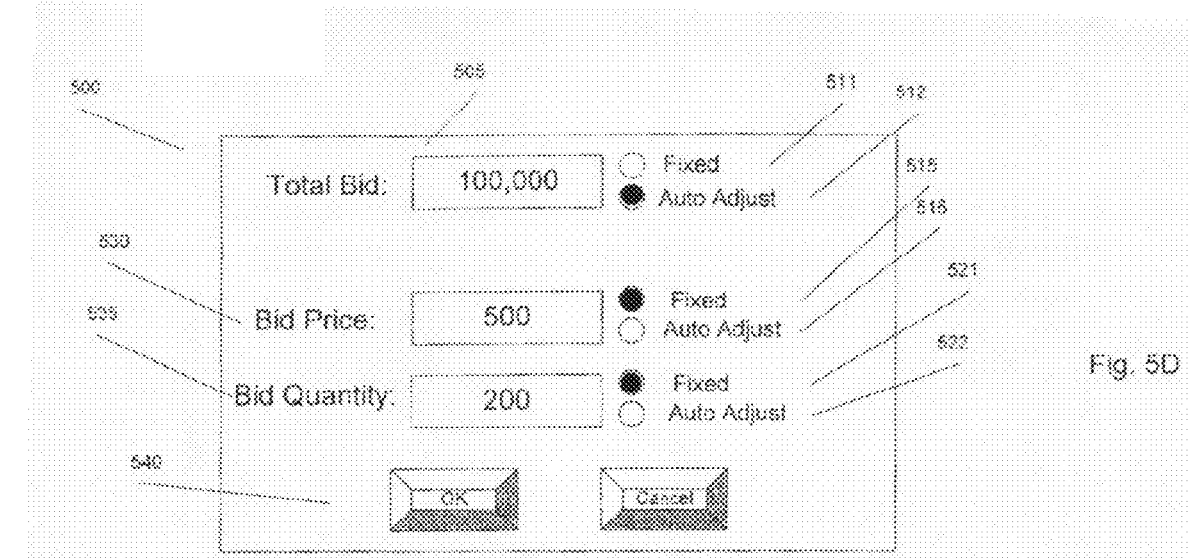
Figure 5E:
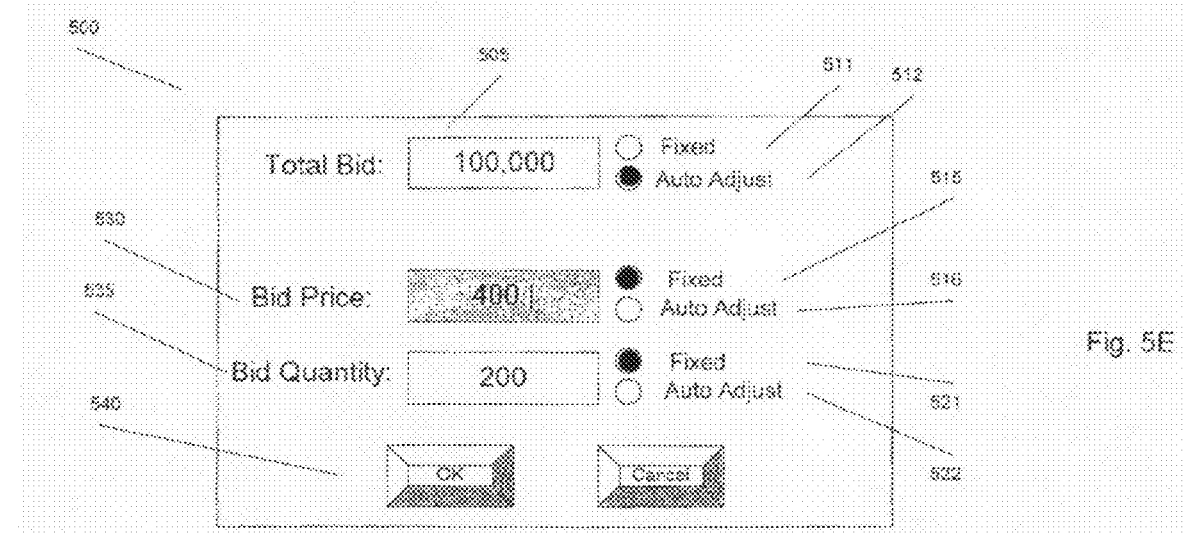
Figure 5F:
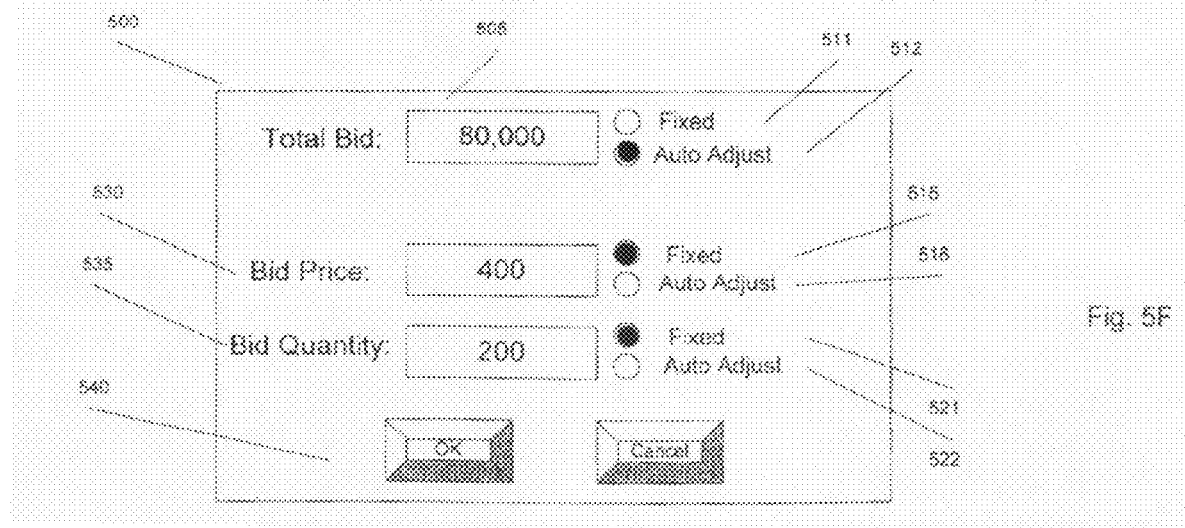
Figure 6:
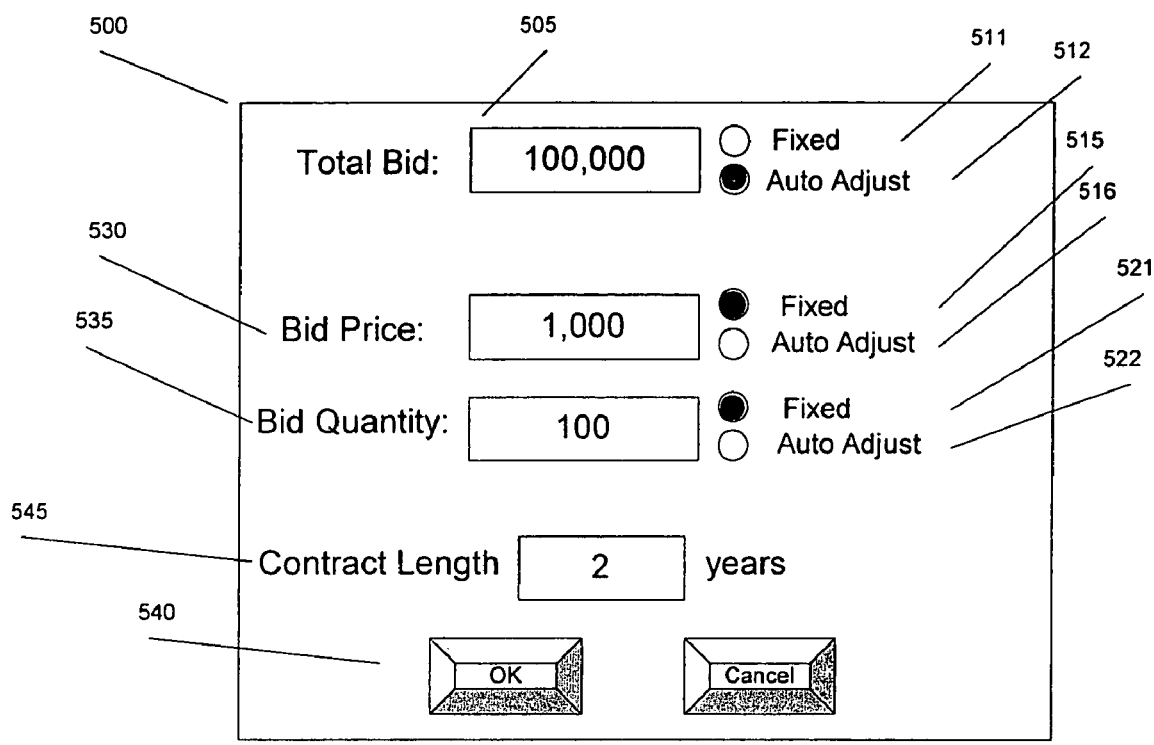
FIG. 6 illustrates an example of a user interface for a bid that has bid variables that can be configured to be automatically adjustable, and other bid variables that cannot be configured to be automatically adjustable.

FIGS. 5D-5F illustrate the second example discussed above, wherein the total bid is automatically adjustable, as shown by radio button 512. FIG. 5D shows the bid before the bidder changes the bid price to $400. FIG. 5E shows the bidder changing the bid price 530 to $400. When the bidder presses the <Enter> button, the total bid value 505 is automatically adjusted to 80,000 so that the bid quantity 535 of 200 is maintained, as shown in FIG. 5F.

Although in the example given above the function used to transform bid variables into a total bid value is linear, it will be obvious to one skilled in the art that any type of function, or combination of functions, may be used to transform bid variables.

In one embodiment of the present invention, the bidder may set a maximum and/or minimum value for the automatic bid adjustment of a bid variable. In this embodiment, the bid variable may not be automatically adjusted to be more (or less) than this value. This will prevent bidders from accidentally changing bid variables to uneconomic levels or such that they do not conform to internal corporate guidelines. Alternatively, the system may set a maximum and/or minimum automatic adjustment values for a bid variable. This will prevent other bidding errors, such as bidding a negative quantity. As an additional check, the system may enforce automatic bid adjustment rules. For example, an auction may have a bidding rule whereby only one bid variable is allowed to be automatically adjustable at a time. In another embodiment of the present invention, only certain bid variables may ever be automatically adjustable. Other checks are known to those skilled in the art and are intended to come within the scope of the present invention.

Although the example given above used two bid variables, the automatic bid variable adjustment mechanism of the present invention may be implemented for bids that have more than two variables. As discussed above, in one embodiment, the bidders may be constrained to having only one variable or the total bid value adjustable at a time. That is, the software may not allow the bidder to set more than one variable to be automatically adjustable simultaneously in this embodiment. In another embodiment, the bidder may allow the system to automatically adjust any number of variables, and the system distributes the automatic adjustment across all "adjustable" variables. The automatic adjustment distribution in this case may be pro rata. Alternatively, the system or the bidder may define a formula for the automatic adjustment distribution. For example, the bidder may select a primary automatic adjustment bid variable and a secondary automatic adjustment bid variable. In this case, the secondary bid variable will only be automatically adjusted if the primary bid variable has reached a maximum or minimum value. Other variations will be obvious to those skilled in the art, and are intended to come within the scope of the present invention.

As discussed above, in one embodiment of the present invention, certain variables or the total bid may not be allowed to be automatically adjusted. In this case, the user will not be given the ability to set the automatic adjustment of these variables and any variable that cannot be automatically adjusted will not have the radio buttons.

For instance, suppose in the above example, a third bid variable, contract length, is used when calculating the total bid, and this variable may not be automatically adjusted. The bid entry screen may look like FIG. 6, wherein the "contract length" variable 545 does not have an automatic adjustment radio button.

Figure 7A:
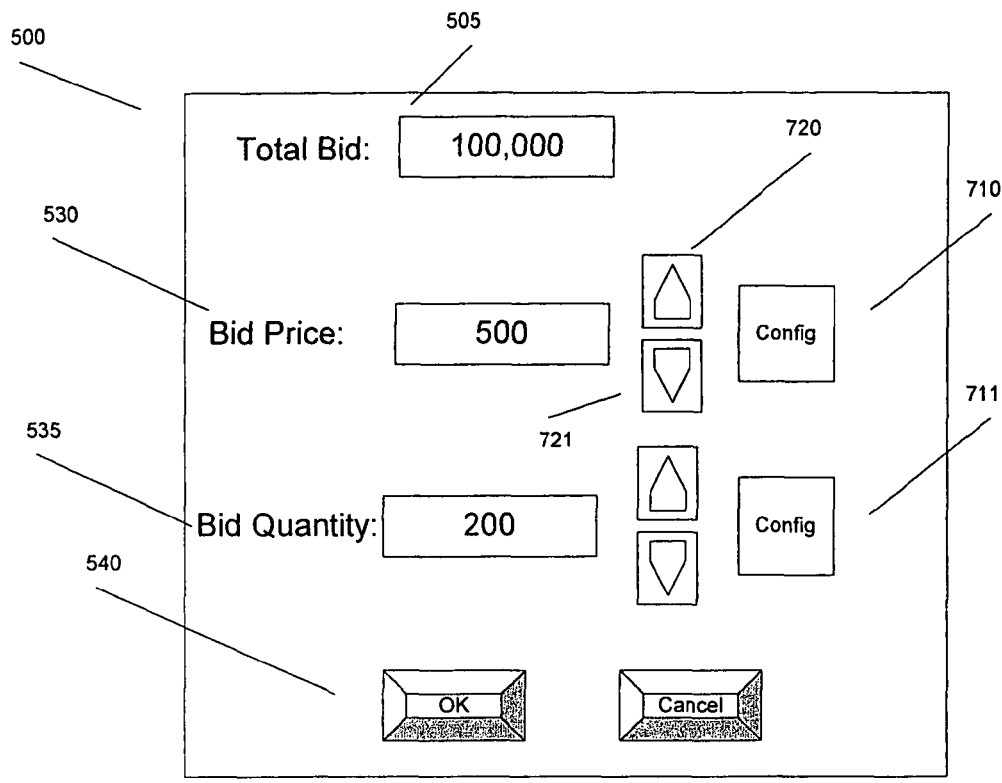
FIGS. 7A and 7B illustrate examples of a bid configuration interface that can be used to set several features of bid variable adjustment.

In another embodiment of the present invention, a bid adjustment configuration button 710, 711 may be used in the bid entry user interface 500 instead of radio buttons, as shown in FIG. 7A. In this embodiment, when a bidder clicks on the bid adjustment configuration button 710, 711, a separate interface (shown in FIG. 7B) is presented to the bidder so that the bidder can configure bid variables to be automatically adjustable or fixed. Preferably, the user can set additional bidding configurations in this interface as well.

This configuration interface is preferably used in connection with bid adjustment buttons 720, 721, as disclosed in copending United States patent application, "Method and System for Configurably Adjusting a Bid in an Online Auction", filed concurrently herewith, which is hereby incorporated by reference.

Figure 7B:
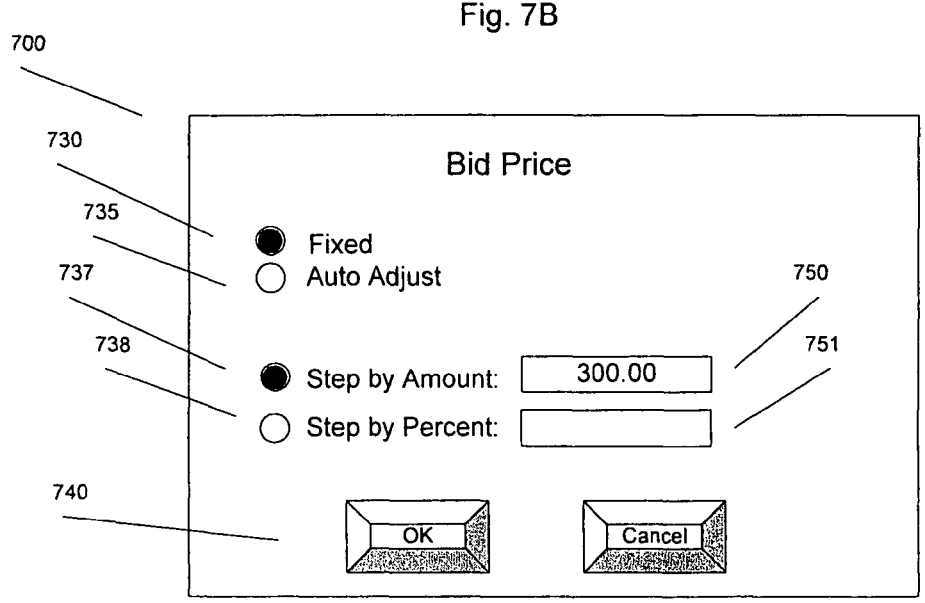

An example of a bid adjustment configuration interface that may be displayed to bidder after the bidder clicks on the bid adjustment configuration button 710 for bid price is shown in FIG. 7B. As shown in this example, the bidder has the ability to set a bid variable to be automatically adjustable with buttons 730, 735, as well as set the type 737, 738 and value 750, 751 of adjustment when using the bid adjustment buttons 720, 721. In this embodiment, a similar interface is shown for setting the configuration of the bid quantity bid variable. In an alternative embodiment, the bid entry window has only one bid configuration button, and the bid configuration window allows the user to set all configuration options for all bid variables.

As will be apparent to one skilled in the art, there are many variations of user interfaces that can be used to allow the user to set bid variable to be automatically adjustable. A few examples are given here, but the scope of the present invention is intended to cover any variation of user interface that allows for the automatic adjustment of bid variables.

As another example, a particular auction may be a Net Present Value (NPV) auction, wherein bids are adjusted to a Net Present Value before being compared. NPV auctions are discussed in greater detail in co-pending application Ser. No. 09/282,056, entitled "Method and System for Conducting Electronic Auctions with Net Present Value Bidding", filed Mar. 31, 1999, the disclosure of which is hereby expressly incorporated in the present application.

Generally, NPV bidding enables the creation of flexible auctions in which bidders can submit bids involving different cash flows over time. In such an auction, the bid variables discount rate and contract period, for example, may be automatically adjusted using the system of the present invention.

As will be obvious to one skilled in the art, the automatic bid adjustment mechanism of the present invention may be used for any parameter of a bid. As will also be obvious to one skilled in the art, the use of buttons is not required, and any type of interface, such as a depression of particular key(s) on a keyboard, depression of a mouse button and/or voice-recognition software, may be used for incrementing/decrementing in accordance with the present invention.

What is claimed is:

1. A system for facilitating an auction, comprising:
   a processor configured to:
   receive a plurality of bid variables from a bidder, wherein at least one bid variable is designated as a fixed variable and wherein at least one bid variable is designated as an adjustable bid variable;
   determine an initial total bid value for the bidder based at least in part on the received bid variables;
   receive at least one subsequent bid variable from the bidder; and
   adjust the total bid value for the bidder in accordance with the received subsequent bid variable and one or more rules governing the adjustment of bid variables designated as adjustable bid variables; and
   a memory configured to store the one or more rules and configured to provide the processor with instructions.

2. The system of claim 1 wherein the at least one bid variable designated as fixed is designated as fixed by a sponsor of the auction.

3. The system of claim 1 wherein the at least one bid variable designated as adjustable is designated as adjustable by a sponsor of the auction.

4. The system of claim 1 wherein the at least one bid variable. designated as fixed is designated as fixed by the bidder.

5. The system of claim 1 wherein the at least one bid variable designated as adjustable is designated as adjustable by the bidder.

6. The system of claim 1 wherein the at least one bid variable designated as fixed is designated as fixed by the bidder and is subsequently designated as adjustable by the bidder.

7. The system of claim 1 wherein the at least one bid variable designated as adjustable is designated as adjustable by the bidder and is subsequently designated as fixed by the bidder.

8. The system of claim 1 wherein the one or more rules include a rule that specifies a minimum value for a bid variable.

9. The system of claim 1 wherein the one or more rules include a rule that specifies a maximum value for a bid variable.

10. The system of claim 1 wherein at least one of the bid variables in the plurality of bid variables describes an inherent characteristic of the bidder.

11. The system of claim 1 wherein the fixed variable can be manually adjusted by the bidder.

12. The system of claim 1 wherein the adjustable variable can be automatically adjusted by the system.

13. The system of claim 1 wherein the one or more rules include a rule that allows a bidder to predefine an automatic adjustment value for a bid variable prior to the start of the auction.

14. The system of claim 1 wherein the one or more rules include a rule that only one bid variable may be automatically adjusted at a time.

15. The system of claim 1 wherein the one or more rules include a rule that multiple bid variables may be automatically adjusted at a time.

16. A method for facilitating an auction, comprising:
   receiving a plurality of bid variables from a bidder, wherein at least one bid variable is designated as a fixed variable and wherein at least one bid variable is designated as an adjustable bid variable;
   determining, using a processor, an initial total bid value for the bidder based at least in part on the received bid variables;
   receiving at least one subsequent bid variable from the bidder; and
   adjusting the total bid value for the bidder in accordance with the received subsequent bid variable and one or more rules governing the adjustment of bid variables designated as adjustable bid variables.

17. The method of claim 16 wherein the one or more rules include a rule that allows a bidder to predefine an automatic adjustment value for a bid variable prior to the start of the auction.

18. The method of claim 16 wherein the at least one bid variable designated as fixed is designated as fixed by the bidder and is subsequently designated as adjustable by the bidder.

19. The method of claim 16 wherein the adjustable variable can be automatically adjusted by the system.

20. A computer program product for facilitating an auction, the computer program product being embodied in a tangible computer readable medium and comprising computer instructions for:

receiving a plurality of bid variables from a bidder, wherein at least one bid variable is designated as a fixed variable and wherein at least one bid variable is designated as an adjustable bid variable;

determining, using a processor, an initial total bid value for the bidder based at least in part on the received bid variables;

receiving at least one subsequent bid variable from the bidder; and adjusting the total bid value for the bidder in accordance with the received subsequent bid variable and one or more rules governing the adjustment of bid variables designated as adjustable bid variables.

* * * * *